Aug. 6, 1963 G. DEMOS 3,100,124
DRIVE-AWAY METHOD AND APPARATUS FOR TRANSPORTING
AUTOMOTIVE VEHICLES
Filed July 18, 1961 2 Sheets-Sheet 1
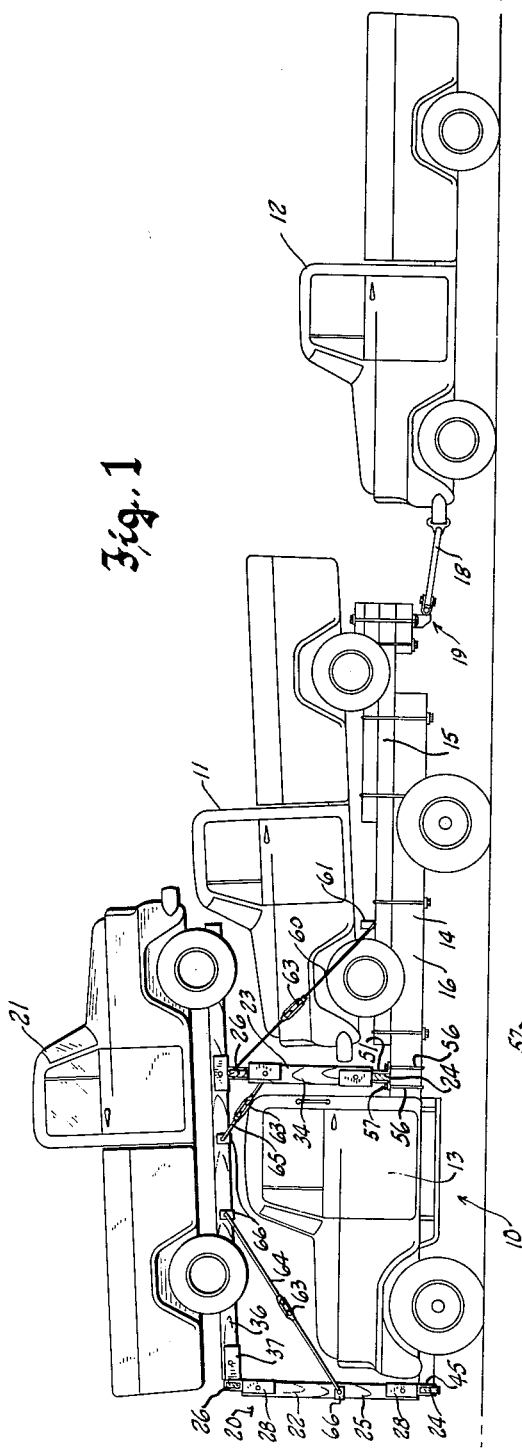
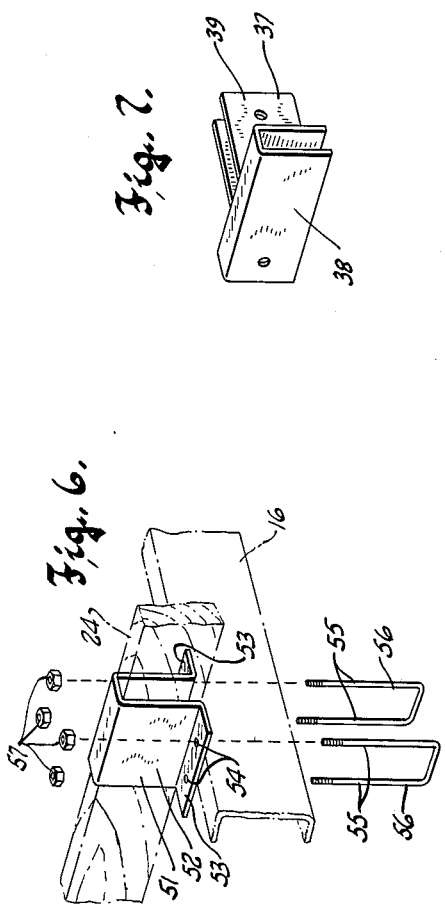
INVENTOR
George Demos
BY
ATTORNEY

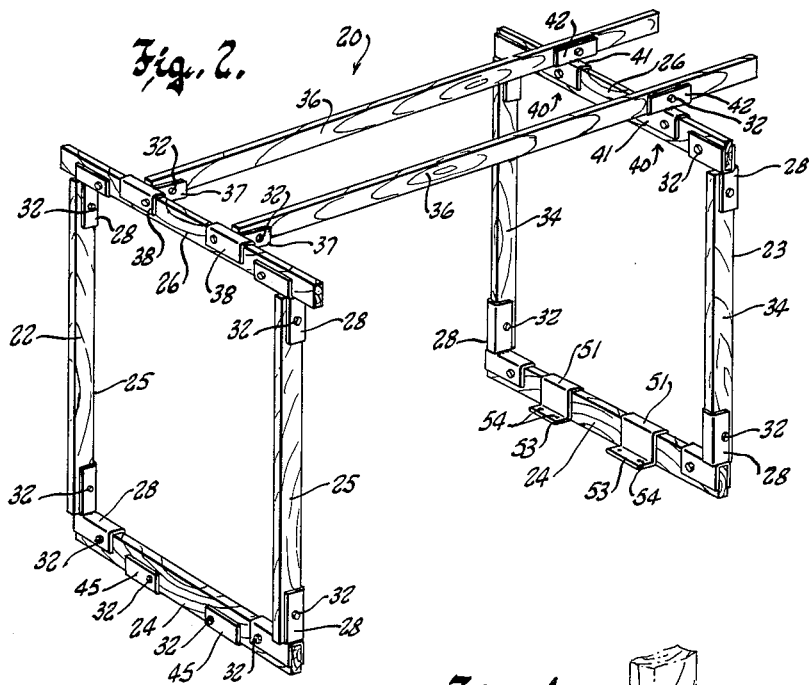
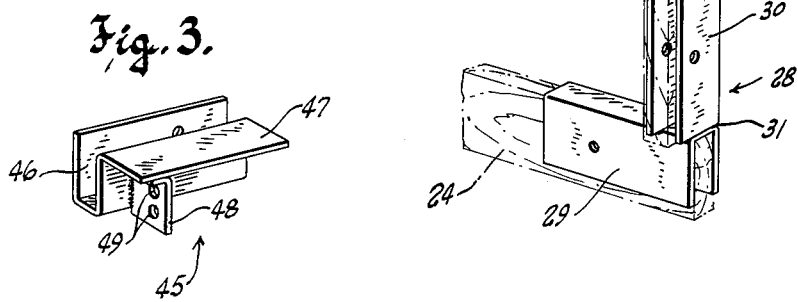
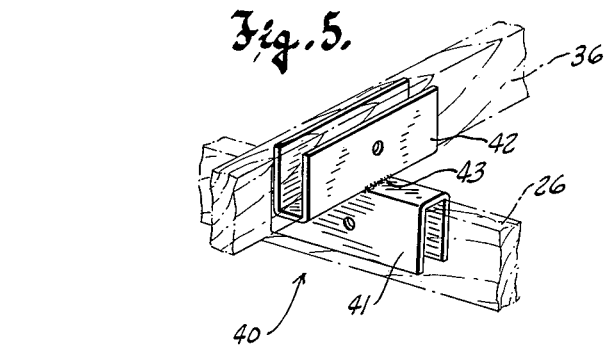

United States Patent Office 3,100,124
Patented Aug. 6, 1963

3,100,124
DRIVE-AWAY METHOD AND APPARATUS FOR TRANSPORTING AUTOMOTIVE VEHICLES
George Demos, Racine, Wis., assignor to Nicholas Demos, Kenosha, Wis.
Filed July 18, 1961, Ser. No. 124,922
5 Claims. (Cl. 296—1)

This invention relates generally to the transportation of automotive vehicles and has more particular reference to a method and apparatus for use in transporting vehicles by the so-called drive-away system.

It has been the custom to transport automotive vehicles such as trucks, automobiles or the like, from their point of origin to dealers located substantial distances away by the so-called drive-away system. According to that system, one of the vehicles to be delivered always comprises a truck having a bodiless rear portion, a second vehicle to be delivered is placed upon the rear of the truck and carried thereby, and a third vehicle to be delivered is draft coupled to the rear of the truck by a tow bar or the like. Thus, one person driving the truck is able to deliver three automotive vehicles by this expedient. After delivery is made, of course, the driver must use some form of public transportation to return to the point of origin.

Heretofore, it was possible to deliver a maximum of only three such automotive vehicles by the drive-away system described. With this limitation in mind, it is the primary purpose of this invention to provide a drive-away method of transporting automotive vehicles of the character described, which enables the transportation of one more vehicle than was possible heretofore.

More specifically, it is the purpose of this invention to provide an improved method of transporting automotive vehicles by the drive-away system, the practice of which method makes possible for the first time the transportation of four automotive vehicles, and which method is generally characterized by erection of a readily dismountable superstructure over the driver's cab of the towing unit of the combination, and the placement of the fourth automotive vehicle on said superstructure in a transit position over the cab of the towing unit.

As indicated, the operator of any drive-away transport combination must return to the point of origin of the vehicles by bus, train, or some other public means of transportation after making delivery of the vehicles. Hence, it will be apparent that the disposition of the superstructure employed to make four-unit drive-away transportation of automotive vehicles possible, presents a problem once the driver has arrived at his destination. It would be desirable, of course, to return the superstructure to the point of origin of the automotive vehicles for reuse on other drive-away deliveries. However, any superstructure employed to support automotive vehicles such as panel or pickup trucks, or even a conventional passenger automobile, must be quite rigid, thus requiring it to be comprised of strong and heavy structural members. Consequently, the shipping costs incurred in returning the components of the superstructure to the point of origin of the automotive vehilcles would in most instances render the transportation of automotive vehicles by the drive-away system noncompetitive with other existing transporting methods involving the use of truck-trailer combinations or so-called piggyback devices for transporting automotive vehicles on railroad freight cars.

With this problem in mind, it is another object of this invention to provide readily dismountable superstructure for use in a four-unit drive-away combination of the character described, wherein all of the main components of the superstructure are provided by inexpensive wood timbers that are readily disposable once the driver of the combination has reached his destination.

Further in this connection, it is another object of this invention to provide reusable bracket means of sturdy metal construction, capable of rigidly connecting the wood timbers of the superstructure to one another, and of being easily accommodated in a relatively compact carton that the driver of the four-unit combination can take with him on any form of public transportation employed to return the driver to the point of origin of the automotive vehicles.

With these and other objects in view which will appear as the description proceeds, this invention resides in the novel method and apparatus substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a side elevational view illustrating how the method and apparatus of this invention enables transportation of four automotive vehicles by the drive-away system;

FIGURE 2 is a perspective view of the superstructure per se, which is adapted to receive and support the fourth automotive vehicle of the combination during transit;

FIGURE 3 is a perspective view of one of the pair of brackets employed to detachably connect the front of the superstructure to the front of the chassis of the towing unit of the combination;

FIGURE 4 is a perspective view of a bracket such as employed to detachably connect the adjacent ends of the superstructure timbers to one another;

FIGURE 5 is a perspective view of a bracket such as employed to detachably connect the longitudinally extending automobile supporting timbers of the superstructure to the rear of the superstructure;

FIGURE 6 is a perspective view of a bracket such as is employed to detachably connect the rear of the superstructure to the chassis of the towing unit of the combination; and FIGURE 7 is a perspective view of a bracket such as employed to detachably connect the longitudinally extending automobile supporting timbers of the superstructure to the front of the superstructure.

Referring now more particularly to the accompanying drawings, in which like reference characters have been applied to like parts throughout the views, the numeral 10 generally designates a truck, such as conventionally used for the towing unit of past drive-away combinations wherein a second automotive vehicle 11 is ordinarily carried on the bodiless rear portion of the truck, and a third automotive vehicle 12 is towed behind the truck. The truck 10 ordinarily has a driver's cab 13 and a bodiless chassis portion 14 of substantial length, behind the cab.

Following conventional practice, the second automotive vehicle 11, here illustrated by way of example as comprising a pickup truck of a well known make, is supported upon timbers 15 that are secured to the parallel, longitudinally extending channels 16 which comprise the truck chassis, with the axles of the vehicle 11 extending across and resting upon the timbers 15. Suitable U-bolt type fasteners securely clamp the timbers 15 to the truck chassis. For transport, of course, the pickup truck 11 is secured to its supporting timbers 15 by conventional tie-down means, not shown.

The rear or towed vehicle 12 likewise is here illustrated by way of example as comprising a second pickup truck, and it is connected by a tow bar 18 to the rear of the towing unit or truck 10 in any suitable manner. As here shown, the tow bar is connected to the front of the trailing vehicle 12 and its forward end is attached to a hitch, as at 19, carried by a cross bar secured to the undersides of the timbers 15 which support the vehicle 11.

While conventional drive-away combinations were limited to the transportation of three automotive vehicles 10, 11 and 12 such as described, this invention makes use of superstructure means, generally designated 20, detachably mounted on the truck 10 to enable transportation of a fourth automotive vehicle 21 as one of the units of the drive-away combination. The vehicle 21 has here also been illustrated as comprising a pickup truck, although it will be understood that the vehicles 11, 12 and 21 may be passenger automobiles, panel trucks, or the like.

It is a feature of this invention that the superstructure is constructed of wood timbers and metal fittings which join together the various timbers. These timbers are inexpensive and readily discarded at the time delivery of the automotive vehicles is made to a dealer. The metal fittings, however, are not discarded, but are brought back to the point of origin of the vehicles by the driver, after delivery of the vehicles has been made.

The superstructure means 20, in general, comprises similar upright substantially rectangular front and rear frames 22 and 23, respectively, extending transversely of the truck 10. The front frame is adapted to occupy a position at the extreme front of the truck 10, and comprises a lower transverse timber or beam 24 of a length to extend entirely across the front of the truck, a pair of upright timbers 25 providing posts that seat on and extend upwardly from the opposite ends of the beam 24 to a height substantially corresponding to that of the top of the driver's cab, and an upper transverse timber or beam 26 that rests upon and spans the upper ends of the posts 25.

Brackets 28 of the type illustrated in FIGURE 4 provide for rigidly joining the adjacent ends of the posts 25 and beams 24 and 26. These brackets comprise pairs of channel sections 29 and 30, welded together as at 31 to form corner fittings in which the channel sections 29 are horizontal and receive the end portions of the transverse beams, and the channel sections 30 are vertical and receive the end portions of the posts 25.

The brackets 28 are identical, except that they are made in right and left hand pairs. For example, the brackets in the upper left and lower right corners of the frame 22 as seen in FIGURE 2, are identical with that shown in FIGURE 4 and have one end of the vertical channel section 30 welded to the back of the channel section 29, at one end of the latter. The brackets 28 at the other two corners of the frame 22 have the vertical channel sections 30 welded endwise to the opposite end of the channel sections 29.

Thus, the flanges of all the vertical channel sections 30 project forwardly so that their web portions engage the rear surfaces of the post forming timbers 25. At the top of the front frame, the flanges on the horizontal channel sections 29 project upwardly so that the upper beam 26 rests upon their webs. At the bottom of the frame, however, the webs of the horizontal channel sections engage the tops of the cross beam 24 and their flanges project downwardly.

Since the end portions of the beams and posts are substantially snugly received in the channel sections of the brackets, a single bolt 32 passing through the flanges of each section and the timber therein is all that is required to rigidly connect the beams to the posts.

The rear frame 23 of the superstructure is almost identical to the front frame 22. Its upright timbers which provide the posts 34, however, are slightly shorter than the posts 25 of the front frame. While the lower transverse beam 24 of the front frame is disposed at bumper level on the front of the truck 10, its counterpart on the rear frame rests directly upon and extends transversely across the chassis of the truck directly behind the driver's cab 13.

The upper beam 26 of the rear frame is likewise identical to the upper beam of the front frame. It extends across the tops of the posts 34, and the adjacent end portions of the posts and beams of the rear frame are also connected together in an exceptionally rigid fashion by means of the brackets 28 described previously.

The superstructure further includes a pair of elongated vehicle supporting timbers 36 which have their forward end portions in abutting relation with and connected to the upper beam 26 of the front frame, and have their rear portions resting on and extending beyond the upper beam 26 of the rear frame.

Metal brackets 37, such as illustrated in FIGURE 7, comprising a pair of channel sections welded together substantially in the form of a T, as illustrated, are provided to rigidly secure the forward end portions of the longitudinal timbers 36 to the upper beam 26 of the front frame. In this case, each of the brackets 37 comprises a transverse channel section 38 to fit down over the front beam 26, and a longitudinal channel section 39 having one end welded to the rear flange of the section 38, and in which the forward end portion of one of the longitudinal timbers 36 is received with the web of the section 39 beneath the timber. Again, a single bolt 32 passing through the flanges of the two channel sections of each bracket, and through the end portions of the timbers therein, is all that is required to effect very rigid joints between the upper front beam and the forward end portions of the longitudinal timbers 36.

As stated, the rear portions of the timbers 36 extend over and beyond the upper rear beam 26, and they are rigidly but detachably secured thereto by means of brackets generally designated 40, such as seen in FIGURE 5. Each of these brackets comprises a transverse lower channel section 41 with downwardly projecting flanges, and an upper channel section 42 with upwardly facing sections. The mid-portions of these channel sections are welded together as at 43, in back-to-back relation, but at right angles to one another, and the transverse sections 41 fit down over the upper rear beam 26, while the longitudinal sections 42 have their webs disposed under the timbers 36. A single bolt 32 is again all that is required to securely anchor each timber in its channel.

The superstructure 20 is mounted in position on the truck 10 by attachment of the two lower beams 24 to its chassis. For that purpose, the bumper is removed from the front of the truck, and the lower cross beam 24 of the front frame 22 is secured to the bumper mounts, in place of the bumper.

The attachment of the lower front beam 24 to the bumper mounts is effected by means of a pair of brackets 45, such as shown in FIGURE 3. These are bolted to the medial portion of the beam at locations corresponding to the spacing of the bumper mounts, comprises an upwardly opening transverse channel section 46 in which the beam 24 is snugly received, a horizontal rearwardly projecting flange 47 to overlie the adjacent bumper mount, and a clip angle 48 depending from the flange 47 and welded to it and to the rear of the channel section 46. The clip angles are adapted to be fastened to the bumper mounts of the truck 10, and for that purpose, each is provided with a pair of holes 49 to receive the bolts, not shown, employed to fasten the brackets 45 to the bumper mounts.

A single bolt 32 passing through the upright legs of each channel section 46 and the beam therein securely anchors the bracket to the beam.

With the lower front cross beam 24 securely anchored to the front of the truck chassis in this manner, the front frame may be completed using the brackets 28 to secure the ends of the posts 25 to the opposite ends of the upper and lower beams 24 and 26.

The lower beam 24 of the rear frame 23 is anchored in positioned on the channels 16 of the truck chassis, directly behind the driver's cab 13. A pair of brackets 51 such as illustrated in FIGURE 6, is provided for that purpose. Each of these brackets comprises a channel section 52 that fits over the beam 24, and has downwardly extending flanges which terminate in outwardly projecting legs 53. Each of the legs 53 has a pair of holes 54 therein spaced apart a distance slightly greater than the width of the chassis channel 16, and located at opposite sides of the latter when the bracket 52 is properly positioned on the beam 24.

The legs 53 of each bracket are preferably spaced slightly above the top of the adjacent channel 16, and the holes in each are adapted to receive the upper ends of the legs 55 of a U-bolt 56 straddling the channel 16 from beneath, so that nuts 57 threaded onto the extremities of the legs 55 may tightly draw the lower rear beam 24 down onto the truck chassis in an exceptionally secure manner that prevents rocking thereof about the longitudinal axis of the beam.

After the lower rear beam 24 has been clamped to the truck chassis in the manner described, the rear frame of the superstructure may be completed following the same procedure employed with the front frame.

The longitudinal timbers 36 may then be connected to the upper beams of the front and rear frames in the manner described and as illustrated in FIGURE 2, using the brackets 37 and 40 described previously. It is important to note, however, that the two longitudinal timbers 36 are held by their connections with the two transverse beams 26, that they are parallel and spaced apart a distance to readily receive the front and rear axles of the fourth automotive vehicle 21 to be loaded onto the superstructure. In other words, the two longitudinal beams 36 fit inside the wheels at each side of the vehicle 21, and in this connection, they distinguish from superstructures used in the past on truck-trailer type transport combinations wherein wheel receiving tracks or ramps were provided to support an automotive vehicle over the cab of the truck.

Cables 60 may be connected to opposite end portions of the upper rear beam 26 of the superstructure, and to opposite sides of the chassis of the truck 10, to provide maximum stability and assurance against fore and aft sway of the superstructure. The upper ends of the cables 60 are preferably secured to the brackets 28 on the rear beam 26, being anchored thereto by the bolt 32 that fixes the beam 24 to the bracket. The lower ends of the cables are shown connected to a cross beam 61, which is secured to the truck chassis and the timbers that support the vehicle 11 on the rear of the truck. The cross beam 61 is located a distance rearwardly of the driver's cab, and behind the forward wheels of the vehicle 11. It preferably extends outwardly beyond the opposite sides of the vehicle 11 so that the cables 60 may clear its sides at the front of the vehicle. It will be understood that the cross beam 61 may be considered as a part of the superstructure 20, especially if it is necessary to clamp a separate cross beam to the chassis timbers in order to secure the cables 60 thereto.

A turnbuckle 63 in each cable 60 allows the cables to be tensioned to the desired degree.

Pairs of front and rear cables 64 and 65, respectively, also may be connected between the longitudinal timbers 36 and the front and rear posts 25 and 34, to cooperate with the cables 60 in stabilizing the superstructure. The ends of the cables 64 are secured to metal clips 66 that are detachably bolted to the timbers 36 and the posts 25. The rear cables 65 have their forward ends secured to other clips 66 on the timbers 36, and their rear ends secured to the vertical sections 30 of the brackets at the top of the rear frame, as by attachment to the bolts 32 which hold the rear posts 34 in the channel sections 30. A turnbuckle 63 is also connected in each cable 64—65 to enable the same to be properly tensioned.

Obviously, the method of erecting the superstructure may be varied as desired. As one example, the front and rear frames could be sub-assembled before securement of their lower beams to the chassis.

The method of loading the four unit drive-away combination of this invention is not in anywise critical. Also the superstructure 20 can be erected at any time during the loading process. For example, it may be erected using the components described before either vehicle 11 or 12 is placed in its transit position with respect to the leading unit or truck 10.

When once erected, the superstructure provides an exceptionally sturdy support for the automotive vehicle 21, which is loaded onto the longitudinal timbers 36 with the vehicle extending fore and aft of the truck 10, over the driver's cab thereof, and with its foremost end closely adjacent to the front of the truck. The rearwardly facing end of the vehicle 21 will extend beyond the driver's cab and over part of the bodiless chassis portion of the truck. The space between the truck chassis and the overhanging rear portion of the vehicle 21, of course, provides for reception of the low front end portion of the automotive vehicle 11 on the rear portion of the truck 10. Hence the vehicle 21 has its rearmost portion in overlapping relation to the front end of the vehicle 11 therebeneath.

The trailing unit 12 can be coupled to the rear of the truck or to the timbers which are clamped onto its chassis by means of the tow bar 18 at any time desired.

If preferred, however, the vehicle 11 may be first loaded onto the truck, with its axles resting upon the timbers 15 in the conventional manner. Thereafter, the superstructure can be erected for the reception of the upper automotive vehicle 21.

An overhead hoist of a conventional type is employed to load the vehicles 11 and 21. During loading, these vehicles are picked up bodily by the hoist mechanism and deposited with the axles of the unit 11 resting upon the timbers on the truck chassis, and the axles of the unit 21 resting upon the longitudinal timbers 36 of the superstructure. Thereafter these vehicles may be fastened to their supporting timbers by conventional tie down means such as are well known in the art.

From the foregoing description taken together with the accompanying drawings, it will be readily apparent to those skilled in the art that this invention provides an exceptionally simple method of increasing the payload of a drive-away automobile transport combination, which method depends upon the employment of simple but sturdy superstructure means that is comprised of timbers which may be discarded following delivery of the vehicles comprising the combination. Only the brackets which are employed to join the various timbers of the superstructure, and the stabilizing cables are saved after delivery is made, and these may be conveniently stowed in a relatively compact carton that can accompany the operator on his return trip by train, bus, or the like.

What is claimed as my invention is:

1. In a drive-away type automotive vehicle transporting device: a truck having a driver's cab at its front portion, a bodiless chassis portion behind the cab, and bumper attaching means at the extreme front of the chassis; and dismountable superstructure on the front portion of the truck for supporting an automotive vehicle in a transit position over the cab of the truck, said superstructure comprising a pair of longitudinal beams extending rearwardly over and beyond the cab from the extreme front of the truck and spaced laterally from one another a distance to have supporting engagement with the undercarriage of an automotive vehicle on the superstructure, upright front and rear frames detachably connected to and supporting the fore and aft end portions, respectively, of said longitudinal beams and including a lower transverse beam on the front frame detachably connected to said bumper attaching means, a lower transverse beam on the rear frame resting upon and detachably secured to the truck chassis at a location behind the driver's cab, each of said frames further including a pair of upright posts having their lower ends adjacent to the opposite ends of said transverse beam of the frame, an upper transverse beam having its opposite ends projecting beyond the longitudinal beams and adjacent to the tops of said posts, and brackets rigidly joining the adjacent ends of the posts and said transverse beams, each of said brackets comprising a first bracket section shaped to embracingly engage one end portion of one of said transverse beams and to which the latter is detachably connected, and a second bracket section fixed substantially at a right angle to the first bracket section and shaped to embracingly engage an end portion of the adjacent post, and to which the latter is detachably connected.

2. The transporting device of claim 1, wherein all of said beams and posts comprise lengths of low cost material, such as wood, which can be disposed of when the transport device reaches its destination.

3. The transport device of claim 1, wherein said bracket sections are channel shaped and each embraces three sides of the beam and/or post connected thereto.

4. The transport device of claim 3, wherein similar brackets comprised of channel shaped bracket sections joined at right angles to one another detachably connect the longitudinal beams to the upper transverse beams of said front and rear frames.

5. The transporting device of claim 1, wherein said lower front and rear transverse beams are respectively detachably connected to said bumper attaching means and to the truck chassis by means comprising a pair of channel shaped attaching brackets which embrace spaced portions of each of said lower beams, bolts securing the attaching brackets to the lower front beam and to the bumper attaching means, and elongated U-bolts securing the attaching brackets for the lower rear beam to the truck chassis and serving to draw said lower rear beam firmly down onto the chassis.

References Cited in the file of this patent

UNITED STATES PATENTS

| | | |
|---|---|---|
| 2,471,521 | Galey | May 31, 1949 |
| 2,518,413 | Wisner | Aug. 8, 1950 |
| 2,582,767 | Carey | Jan. 15, 1952 |
| 2,684,264 | Demos | July 20, 1954 |